(12) United States Patent
Earle (10) Patent No.: US 8,371,163 B2
(45) Date of Patent: Feb. 12, 2013

(54) TECHNIQUES FOR MONITORING STORM CONDITIONS

(76) Inventor: Marshall Delph Earle, White Stone, VA (US)

( * ) Notice: Subject to any disclaimer, the term of this patent is extended or adjusted under 35 U.S.C. 154(b) by 5 days.

(21) Appl. No.: 13/000,987

(22) PCT Filed: Nov. 11, 2008

(86) PCT No.: PCT/US2008/083146
§ 371 (c)(1), (2), (4) Date: Mar. 1, 2011

(87) PCT Pub. No.: WO2009/157964
PCT Pub. Date: Dec. 30, 2009

(65) Prior Publication Data
US 2011/0259096 A1 Oct. 27, 2011

Related U.S. Application Data

(60) Provisional application No. 61/133,159, filed on Jun. 26, 2008.

(51) Int. Cl.
*G01W 1/00* (2006.01)
(52) U.S. Cl. .................... 73/170.16; 73/170.22
(58) Field of Classification Search ............ None
See application file for complete search history.

(56) References Cited

U.S. PATENT DOCUMENTS

| | | | | |
|---|---|---|---|---|
| 4,930,726 A | * | 6/1990 | Jalbert | 244/90 R |
| 4,956,646 A | * | 9/1990 | Miller et al. | 343/706 |
| 5,115,997 A | * | 5/1992 | Peterson | 244/25 |
| 5,174,529 A | * | 12/1992 | Jalbert | 244/145 |
| 5,470,032 A | | 11/1995 | Williams et al. | |
| 7,231,300 B1 | | 6/2007 | Rose, Jr. | |
| 2003/0120426 A1 | | 6/2003 | Baron, Sr. et al. | |

FOREIGN PATENT DOCUMENTS

WO 2009/157964 A1 12/2009

* cited by examiner

*Primary Examiner* — Andre Allen
(74) *Attorney, Agent, or Firm* — Evans & Molinelli PLLC; Eugene Molinelli

(57) ABSTRACT

In some embodiments, a method for monitoring tropical storm conditions includes determining a target sea-surface path relative to a tropical storm center where in situ measurements are desired. A buoy is configured to include one or more sensors for one or more in situ measurements and to move relative to a local wind in the tropical storm so as to approximately follow the target sea surface path. The buoy is deployed in the tropical storm at a location substantively on the target sea surface path. In some embodiments, a buoy includes means for automatically maintaining position near a sea surface, moving at a particular direction and a particular speed relative to a local wind, measuring one or more environmental conditions in a vicinity of the buoy, and sending, to a remote facility, observation data based on output from the means for measuring one or more conditions.

20 Claims, 7 Drawing Sheets

300 BUOY FOR MONITORING TROPICAL STORM

FIG. 3B

301 SAILING BUOY FOR MONITORING TROPICAL STORM

TECHNIQUES FOR MONITORING STORM CONDITIONS

CROSS-REFERENCE TO RELATED APPLICATIONS

This application is a national phase application of PCT Application No. PCT/US2008/083146, filed on Nov. 11, 2008, and claims priority to U.S. Provisional Appln. 61/133,159, filed Jun. 26, 2008, the entire contents of which are hereby incorporated by reference as if fully set forth herein.

BACKGROUND OF THE INVENTION

1. Field of the Invention

The present invention relates to monitoring storm conditions, especially for tropical storms, such as hurricanes.

2. Description of the Related Art

Tropical storms that develop into hurricanes are well-known to cause significant damage, injuries, and loss of life. Such tropical storms are also known as cyclones and typhoons. As used herein the terms "storm" and "tropical storm" each include any storm known as a tropical storm, hurricane, cyclone or typhoon.

Monetary costs can be large (on the order of hundreds of millions of dollars per year) and there can be major economic disruptions. Measuring oceanographic and meteorological conditions within and near these storms is important to determine their intensities, and enables more accurate predictions of strengths and locations at landfall where most damage occurs.

Present methods of data collection involve deploying meteorological sensors (e.g., dropsondes) from aircraft (e.g., hurricane hunters) and installing data collection buoys at fixed locations. Deployment of sensors from aircraft has been important but suffers from the deficiencies of: extensive personnel; multiple expensive missions; dangerous missions over long ranges; and discontinuous data collection. Measurement of oceanographic and meteorological data from fixed buoys, such as the buoys deployed by the National Data Buoy Center (NDBC), a component of the National Weather Service (NWS), National Oceanic and Atmospheric Administration (NOAA), have also been helpful. However fixed buoys also have deficiencies, including a major deficiency in that a storm may not pass near the fixed buoy. Other deficiencies are that fixed data collection buoys need to be large for mooring in deep water, and they are expensive.

There have been several efforts to develop autonomous buoys, or station-keeping buoys (e.g., for acoustic ocean surveillance for Department of Defense, DoD, applications). Several of these buoys use mechanical propulsion with power provided by batteries, solar cells, or engines. Some of these buoys use sails. These buoys have been designed for maintaining an approximate fixed geographical position.

Various free-drifting buoys have been developed. These buoys drift with prevailing currents and they are designed generally to minimize wind effects. For example, sub-surface drogues (i.e., drag devices) are used to increase drift with currents and decrease drift with winds.

Buoys have been deployed ahead of hurricanes. For example, NOAA and the Navy have deployed, by aircraft, an array of drifting buoys in the tropical Atlantic before hurricane seasons to help hurricane forecasting. These small buoys float partially submerged and have submerged drogues to further reduce effects of the wind in moving them.

To Applicant's knowledge, no buoys have been designed or deployed that attempt to position themselves along a target path relative to a center of the tropical storm as the storm propagates across the sea surface.

SUMMARY OF THE INVENTION

Techniques are provided for monitoring a tropical storm that do not suffer one or more of the deficiencies of prior art approaches.

In a first set of embodiments, a method for monitoring tropical storm conditions includes determining a target sea-surface path relative to a tropical storm center where in situ measurements are desired. A buoy is configured to include one or more sensors for one or more in situ measurements and to move relative to a local wind in the tropical storm so as to approximately follow the target sea surface path. The buoy is deployed in the tropical storm at a location substantively on the target sea surface path.

In some embodiments of the first set, configuring the buoy to move relative to the local wind includes configuring the buoy to move based on power derived from the local wind.

In some embodiments of the first set, configuring the buoy includes configuring the buoy to maintain a substantively constant angle relative to the local wind. The substantively constant angle is toward the center of the tropical storm.

In another set of embodiments, a buoy includes means for automatically maintaining vertical position near a sea surface, moving at a particular direction and a particular speed relative to a local wind, measuring one or more environmental conditions, and sending, to a remote facility, observation data based on measurements of the one or more environmental conditions.

In other embodiments, an apparatus or computer-readable medium is configured to perform one or more steps of the above methods.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for monitoring storms. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of a sailing buoy deployed in a tropical storm in a Northern hemisphere ocean. However, the invention is not limited to this context. In other embodiments the buoy is moved by some other means or is deployed in the Southern hemisphere or is deployed in other weather systems (such as extra-tropical storms, like severe storms in the mid-latitudes of oceans during fall through spring) over the ocean or over some other large body of water, such as a marginal sea (e.g., the Caribbean Sea), enclosed sea (e.g., Black Sea) or large lake (e.g, one or more of the Great Lakes of the United States).

1. Overview

Figure 1:
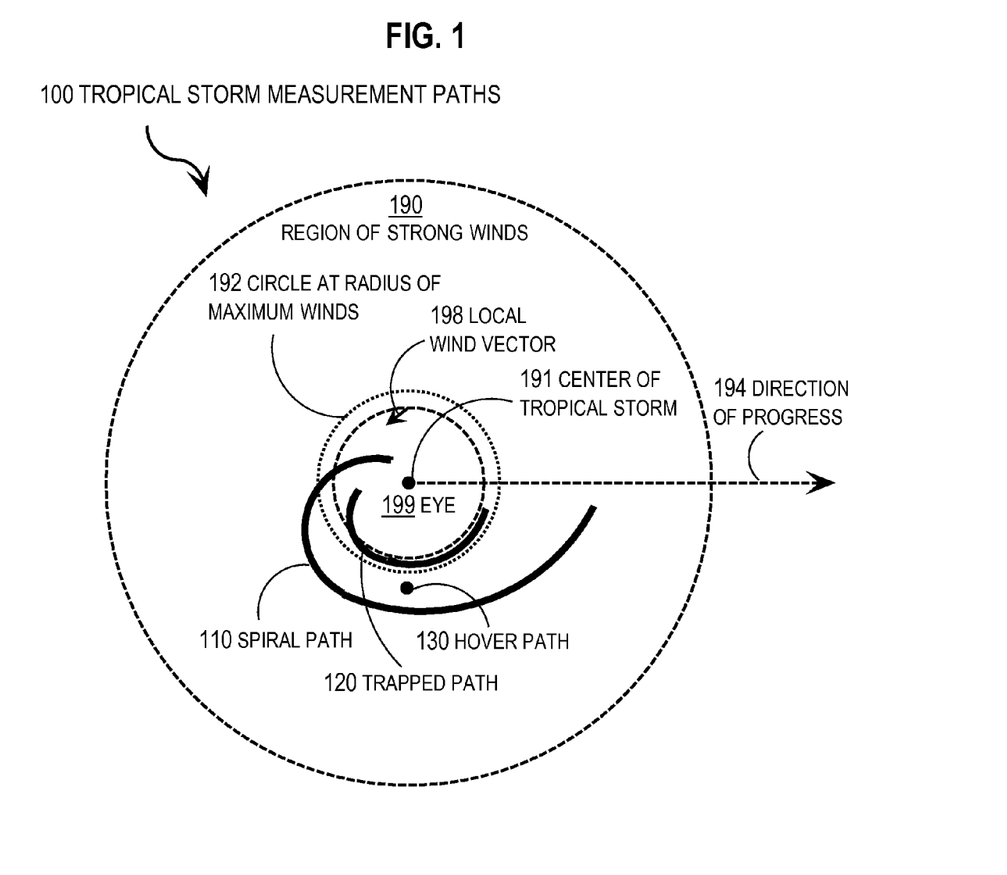
FIG. 1 is a block diagram that illustrates example measurement paths in a tropical storm, according to various embodiments.

FIG. 1 is a block diagram that illustrates example measurement paths 100 in a tropical storm, according to various embodiments. FIG. 1 depicts an idealized tropical storm as an annular region 190 of strong horizontal winds (between dashed circles), with a center 191 in an eye 199 of lighter horizontal winds (but possibly strong vertical updrafts), and a circle 192 of maximum winds (indicated by the dotted circle) at a radius of maximum winds from the center 191. The horizontal winds in the region 190 of strong winds have large speeds (e.g., about 35 miles per hour and more) that circulate counterclockwise around the center 191 in the Northern hemisphere of the Earth and clockwise around the center 191 in the Southern hemisphere of the Earth. In actual storms, the region of high winds is typically only approximately circular, but is depicted in FIG. 1 as circular for simplicity. The horizontal winds are not perfectly clockwise or counterclockwise, but include an inward component toward the center of the storm. As used herein the term "wind" refers to the horizontal component of the wind, unless otherwise indicated explicitly or by context.

The storm center 191 propagates across the water surface (called "sea surface" hereinafter) as indicated by the direction 194 of progress. The direction of progress is typically not constant over long distances, but is depicted as a constant over the scale of the storm itself in FIG. 1 for simplicity. The sea surface is curved to closely follow the gravitational equipotential surface called the geoid, with deviations for tides, currents, atmospheric pressure changes, winds, and waves caused by the wind. As used herein, the term "horizontal" and the term "sea surface" refers to a surface parallel to the sea surface averaged at least over spatial and temporal scales of wind waves, which is not perfectly planar but generally follows the curvature of the Earth.

The local horizontal wind speed and direction at a location is expressed as a vector (directional line segment) with wind direction parallel to the segment and heading indicated by arrowhead on one end of the segment, wind speed proportional to the length of the segment, and location indicated by a tail of the segment opposite the arrowhead. The local wind is related to the local position relative to the storm center 191. For example, the local wind 198 in a Northern hemisphere tropical storm is depicted in FIG. 1 as a vector with counterclockwise and inward components.

Near the center 191, the horizontal component of the wind is nearly zero. As the radial position from the center increases, winds increase and reach a maximum value near the circle 192 at the radius of maximum winds. As the radial position from the center increases further beyond the radius of maximum winds, winds decrease more slowly compared to their increase within the radius of maximum winds. While the wind flows around the center, it also flows somewhat inward toward the center at an angle called the inflow angle.

A key measure of storm strength, or intensity, is the atmospheric pressure decrease near the center 191. As the pressure near the center 191 decreases, the winds become faster and the inflow angles become larger. In addition, a storm moves at a forward speed (also called a speed of storm translation or a speed of storm progress) that can range from nearly zero to significant speeds, particularly in higher latitudes. Looking in the direction that a storm is moving in the Northern hemisphere, horizontal winds are thus faster on the right side than on the left side. There may also be additional wind asymmetries, but these effects are not significant to understand the illustrated embodiments compared to the described wind characteristics For predicting the future strength and progress of the storm, it is useful to have measurements in the storm (in situ measurements) that indicate one or more environmental conditions for as many times as possible, including temporally continuous measurements. Example useful measurements include one or more of water temperature, air temperature, air humidity, wind speed, wind direction, current speed, current direction (at one or more heights above the sea surface or depths below the sea surface) and wind wave height, among others.

According to various embodiments of the invention, the storm is monitored with in situ measurements collected along a measurement path relative to the storm center. Example measurement paths depicted in FIG. 1 include a spiral path 110, a trapped path 120, and a hover path 130. In other embodiments, other measurement paths are used.

The spiral path 110 obtains measurements in the storm at multiple different distances from the storm center. For example, in a Northern hemisphere storm, spiral path 110 starts near the center 191 and slides outward with time in a counterclockwise direction, eventually obtaining a profile of in situ measurements with increasing distance from the center. In the Southern hemisphere the outbound paths spiral in a clockwise direction. In some embodiments, e.g., a Southern hemisphere storm, spiral path 110 starts away from the center 191 and slides inward with time, eventually obtaining a profile of in situ measurements with decreasing distance from the center. The depicted spiral path 110 in the frame of the storm center traces a different, elongated path (not shown) over the sea surface.

The trapped path 120 obtains measurements in the storm at a substantively constant radius from the storm center. For example, the depicted trapped path 120 obtains measurements in a band between the eye of lighter winds and the circle 192 of maximum winds. The depicted trapped path 120 in the frame of the storm center traces a different, looping path (not shown) over the sea surface.

The hover path 130 obtains measurements in the storm at a substantively constant radius and direction from the storm center. Such a path is useful for determining an un-confounded temporal change in the storm (e.g., to determine strengthening or weakening) without confounding changes in the conditions with distance from the storm center. The depicted hover path 110 in the frame of the storm center traces a different, linear path (not shown, but parallel to direction 194 of progress of the storm) over the sea surface.

Applicant realized that at least some desirable measurement paths relative to the storm center (such as spiral path 110, trapped path 120, and hover path 130) could be achieved by a buoy configured to respond to the local wind at the buoy's location. In some various embodiments, the response is a substantively constant fraction of the wind speed, or substantively constant angle from the wind direction, or both. In some embodiments, the response to the local wind is achieved by sailing.

The trajectory, or path, of a sailing floating device often cannot be readily foreseen because of the complicated interplay of storm characteristics including maximum winds, radii of maximum winds, inflow angles, forward speeds, forward directions, and asymmetries and changes with time of these characteristics, combined with a floating device's sailing characteristics. However, if, in some embodiments, a floating device moves with the wind considering the wind inflow angle, and more optimally to the left of the wind direction in the Northern hemisphere and to the right of the wind direction in the Southern hemisphere, and moves at a sufficient fraction of the wind speed, then the floating device could take advantage of the low wind speeds near the center and the high wind speeds near the radius of maximum winds to become trapped or approximately trapped in the storm.

The floating device is designed to move in the wind direction, or at angles to the wind direction. In some embodiments, this capability can be incorporated into the floating device using established concepts of sailing. In the Northern hemisphere, storm winds are directed counter-clockwise relative to the storm's center 191, or eye 199. In the Southern hemisphere, storm winds are directed clockwise relative to the storm's center 191, or eye 199. There is also an inflow angle directing the winds somewhat more toward the storm's center 191, or eye 199. If the floating device sails downwind, or to the left of the wind in the Northern hemisphere, and its sailing speed is a sufficient fraction of the wind speed, the floating device can move with the storm, keeping pace with the storm's forward speed of progress across an ocean. If the floating device sails downwind, or to the right of the wind in the Southern hemisphere, and its sailing speed is a sufficient fraction of the wind speed, the floating device can move with the storm, keeping pace with the storm's forward speed of progress across an ocean. In addition, by adjusting the floating device deployment location, the angle sailed relative to the wind direction, and the fraction of the wind speed sailed, the device can undertake movements to collect data along other measurement paths within regions of a storm.

2. Buoy for Monitoring Tropical Storm

In some embodiments, the buoy responds to the local wind using a sail or airfoil. Applicant realized that there is no present method for collecting oceanographic and meteorological data using a floating device with a means to maintain itself by sailing in the vicinity of a tropical storm as the tropical storm progresses. The terms "floating device" and "buoy" refers to any device, including a buoy and boat-shaped hull, which is not moored or otherwise connected to the sea floor. Sailing is a means for a buoy to maintain itself in the vicinity of a storm as the storm progresses, with consumption of little or no on-board power. A "vessel" is any object with internal space for carrying a payload of any type.

Figure 2:
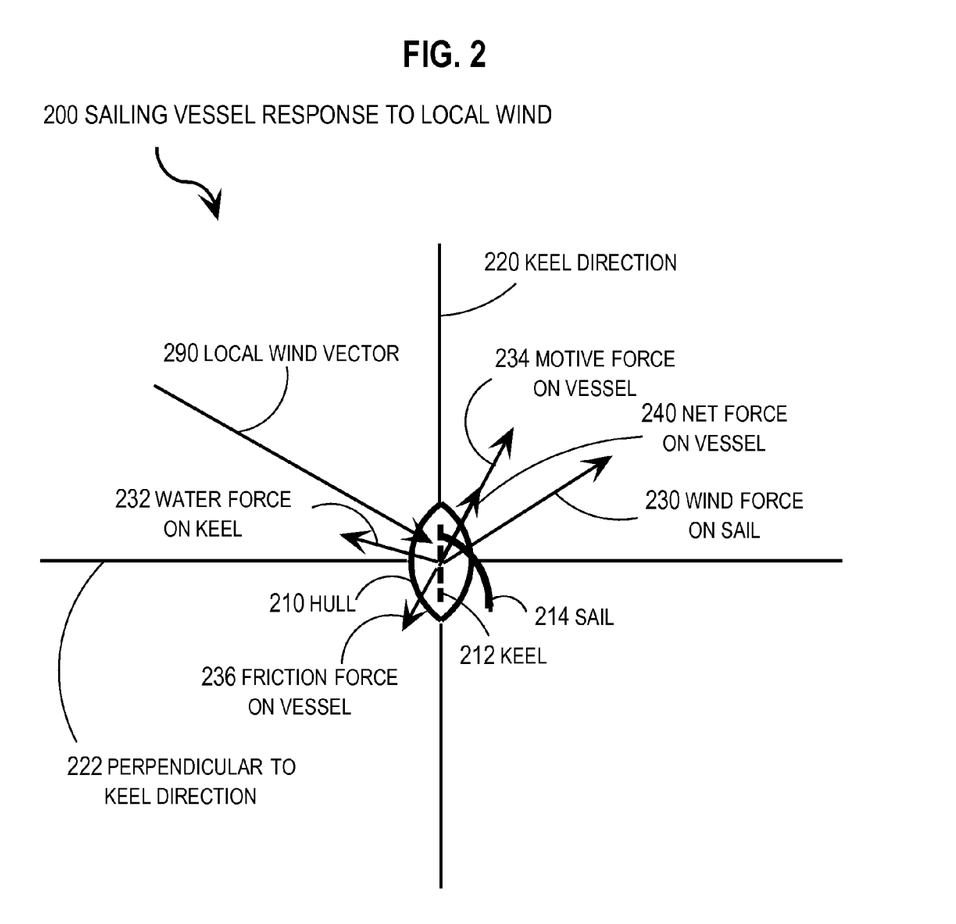
FIG. 2 is a block diagram that illustrates an example response of a sailing vessel to local wind, according to an embodiment.

FIG. 2 is a plan diagram that illustrates an example response 200 of a sailing vessel to local wind, according to an embodiment. As used herein, a buoy with a sail is an embodiment of a sailing vessel. As depicted in FIG. 2, looking down on a sea surface, the sailing vessel includes a hull 210 with keel 212 (dashed to indicate it is hidden below the hull 210) and a sail 214 above the hull. The alignment of the keel 210 is indicated by the keel direction 220; and, its perpendicular direction is indicated by the perpendicular to keel direction 222. The local wind speed (or the related wind force per unit area) and direction is indicated by the local wind vector 290.

Depending on the configuration of the sail 214, a portion of the local wind force applies a wind force on the sail indicated by the wind force on sail vector 230. Water flow around the keel places a force on the keel indicated by the water force on keel vector 232. The vector sum of the sail force vector 230 and the keel force vector 232 is the motive force on the vessel indicted by motive force vector 234. The resulting sailing direction is aligned with the motive force vector 234, at an angle to the wind vector 290. As the hull moves through the water, resistive forces on the hull and keel place a friction force on the vessel indicated by the friction force vector 236, opposite the direction of the motive force vector 234. The net force on the vessel is indicated by the net force on vessel vector 240. The hull accelerates in the direction of the net force vector 240; and the friction force vector 236 increases in magnitude with the increasing speed until the vessel reaches a dynamic equilibrium speed.

As illustrated in FIG. 2, by changing the orientation of the sail, sailing can be at nearly any angle to the wind including downwind, or to the left or right of the wind. The concepts of sailing illustrated in FIG. 2 are well established and widely known (see for example, Anderson, B. D., "The Physics of Sailing," *Physics Today*, volume 61, pages 38-43, 2008).

Figure 3A:
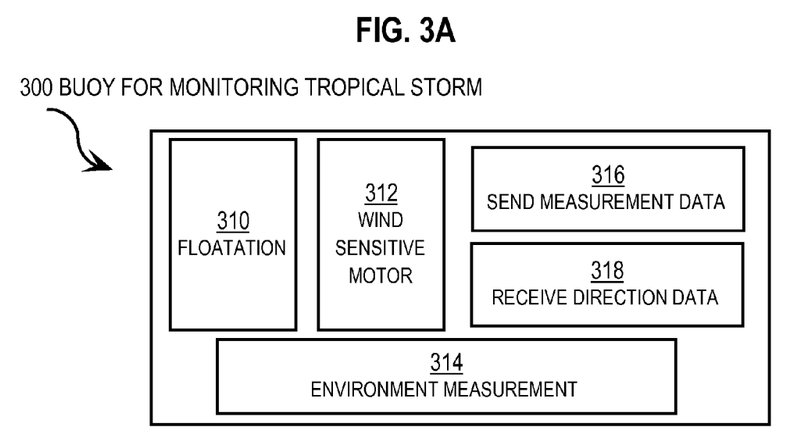
FIG. 3A is a block diagram that illustrates an example buoy for monitoring a tropical storm, according to an embodiment.

FIG. 3A is a block diagram that illustrates an example buoy 300 for monitoring a tropical storm, according to an embodiment. The buoy 300 includes a floatation subsystem 310, a wind sensitive motor 312, an environmental measurement subsystem 314, a subsystem 316 to send measurement data and a subsystem 318 to receive direction data.

Any flotation subsystem 310 known in the art may be used, including air or gas filled sealed vessels made of glass, fiberglass, metal or other rigid or elastic material, foam or other material less dense than sea water. The material comprising the hull itself may be more dense or less dense than sea water. In some embodiments, the floatation subsystem includes a weight disposed below a component that is less dense than seawater in order to keep the buoy 300 oriented in a preferred vertical orientation (called upright or right). In other embodiments, the floatation subsystem 310 includes one or more other mechanisms for self righting. In some embodiments, there is no preferred upright orientation and a righting mechanism is omitted.

The wind sensitive motor 312 is any subsystem that causes the buoy to move horizontally in approximately a particular direction relative to the local wind and at approximately a particular fraction of the wind speed. In the illustrated embodiments, the motor 312 is a sailing subsystem; but, in other embodiments powered motion responsive to detected local wind speed and direction is suitable. An advantage of a sailing component to the subsystem 312 is that the motive power is derived from the local wind and need not be supplied from an on-board power source. Use of sail power greatly simplifies the design of buoy 300 and reduces cost per buoy. In some embodiments, the particular direction and speed fraction relative to the local wind may vary with time in order to achieve a target measurement path through the storm.

The environmental measurement subsystem is any set of one or more devices that make measurements of the environment in the vicinity of the buoy 300. Sensors are known for collecting data such as buoy position, air temperature, water temperature, atmospheric pressure, wind speed, and wind direction. Collection of these kinds of data using sensors on buoys has been done often. Sensors that rise into the atmosphere are also deployed presently from land and sea. In some embodiments, the environmental measurement subsystem 314 includes a component to deploy sensors into the atmosphere to collect data such as sensor elevation, air temperature, atmospheric pressure, wind speed, and wind direction, alone or in any combination. Sensors that descend into the sea are also deployed presently including expendable vertical profiling subsystems such as expendable bathymetric temperature sensors (XBTs). In some embodiments, the environmental measurement subsystem 314 includes a component to deploy sensors into the sea to collect data such as sensor depth, water temperature, current speed, or current direction.

The subsystem 316 to send measurement data includes any mechanism to send data based on the measurements made by the environment measurement subsystem 314. In some embodiments, the subsystem 316 to send measurement data is a data storage unit that is dropped for retrieval by a submerged vehicle. In some embodiments, the subsystem 316 includes an acoustic transmitter that transmits acoustic signals into the air or water to be received by a remote receiver, which serves as a remote facility for predicting the storm's progression or a relay of one or more relay devices to such a remote facility. In some embodiments, the subsystem 316 includes an electromagnetic transmitter, such as a laser or radio transmitter, that transmits electromagnetic signals into the air or water to be received by a remote receiver, which serves as a remote facility for predicting the storm's progression or a relay of one or more relay devices to such a remote facility.

The subsystem 318 to receive direction data includes any mechanism to receive data used to control the wind sensitive motor subsystem 312. In some embodiments, the subsystem 318 to receive direction data is a data storage unit that is included in the buoy when the buoy is configured. In some embodiments, the subsystem 318 includes an acoustic receiver that receives acoustic signals in the air or water sent by a remote transmitter. In some embodiments, the subsystem 318 includes an electromagnetic receiver, such as an optical receiver or radio receiver, which receives electromagnetic signals in the air or water sent by a remote transmitter. In some embodiments, wind sensitive motor subsystem 312 is configured to maintain a constant heading and speed relative to the local wind throughout the measurement path, and subsystem 318 is omitted.

Figure 3B:
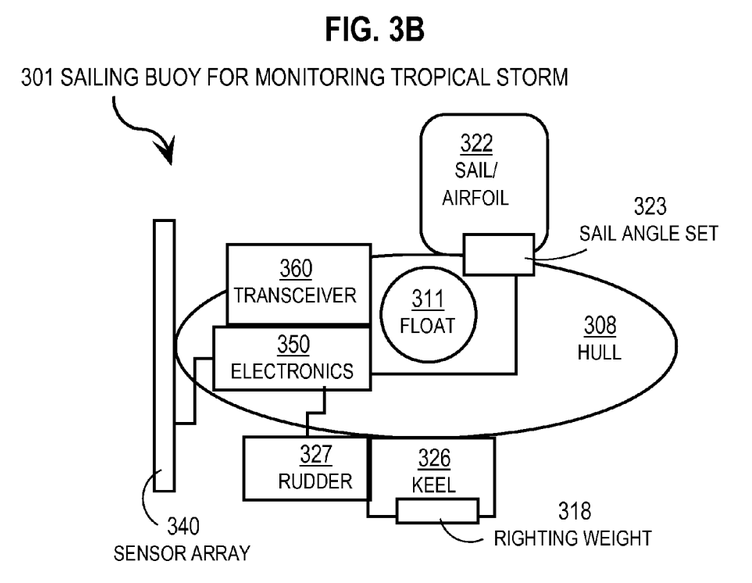
FIG. 3B is a block diagram that illustrates an example sailing buoy for monitoring a tropical storm, according to an embodiment.

FIG. 3B is a block diagram that illustrates an example sailing buoy 301 for monitoring a tropical storm, according to an embodiment. The buoy 301 includes a hull 308, floatation subsystem with float 311 and righting weight 318; a wind sensitive motor subsystem that is a sailing subsystem with sail/airfoil 322, a sail angle set device 323, a keel 326 and a rudder 327; an environmental measurement subsystem that includes sensor array 340 and electronics 350, a subsystem to send measurement data and a subsystem to receive direction data in transceiver 360.

The floatation subsystem includes float 311 with a very low density so that the hull and all its components stays at or above or below but near the sea surface. In some embodiments the float 311 encompasses the majority of the hull, like a beach ball. In the illustrated embodiment, the floatation subsystem includes the righting weight 318, near the lowest point of the buoy, to return the buoy to an upright orientation, as pictured, after capsizing or otherwise being turned over during deployment or by wind or wave. An advantage of the righting weight is to ensure that a sail or airfoil, described next, projects into the local sea surface wind. In some embodiments the righting weight 318 is omitted.

The sail or airfoil (sail/airfoil) 322 includes one or the other or both. As used herein a sail is a flexible fabric or other material attached to the hull by lines, with or without a mast. An airfoil, like an airplane's wing, is a rigid structure that causes air to move faster on one side than the other so that a force is exerted by the wind on a face of the airfoil. An airfoil may be constructed from a rigid material such as metal or fiberglass or from fabric, or other material, that is attached to a frame to be approximately rigid. The sail/airfoil is configured to extend into the local wind for a length of from a few inches to a few feet or tens of feet when the buoy is upright.

In the illustrated embodiment, the angle of the sail/airfoil relative to the hull 308 and attached keel 326 (also called herein the angle of attack) is set in the sail angle set component 323. In some embodiments, the sail angle set component is simply any mast and rigging used to set the sail at a constant angle relative to the keel 326, or any means to fix the airfoil to the hull 308. In some embodiments, the sail angle set device 323 includes mechanisms, such as pulleys and servo motors, to lengthen or shorten the rigging or rotate an airfoil and thereby change the angle of attack, either according to a predetermined time sequence or in response to direction data received, as described in more detail below. In such embodiments, the sail/airfoil angle relative to the hull and keel is changed after the buoy is deployed in order to follow a particular target measurement path. In some such embodiments, the electronics 350 includes components to control the sail angle set device 323 based on direction data stored aboard or received through transceiver 360 or both.

In some embodiments, the hull 308 and keel 326 also are oriented in the water relative to a previous hull and keel orientation by means of the rudder 327. For example, the rudder is operated after the buoy is deployed in order to obtain an initial orientation of the keel or to follow a particular target measurement path. In some such embodiments, the electronics 350 includes components to control the rudder 327 based on direction data stored aboard or received through transceiver 360 or both.

The sensor array 340 includes any combination of one or more sensors that detect environmental conditions, such as thermisters and conductivity sensors on staffs that extend into the air and water, including, in some embodiments, an arsenal of expendable atmospheric or water vertical profilers. Typically, such sensors produce electronic or optical signals that indicate values of detected environmental conditions. In the illustrated embodiment, those signals are input to onboard electronics 350, including one or more general purpose processors, as in one or more computers, responsive to software instructions, or one or more special purpose processors with hardwired processing, or some combination, as described in more detail below with reference to FIG. 7. In some embodiments, data derived from signals received from the sensor array 340 are stored on one or more data storage devices included in electronics 350, at least temporarily, for immediate or delayed transmission to a remote facility.

As suggested above, in some embodiments, the electronics 350 include logic to control rudder 327 or sail angle set device 323 or both in response to stored or received direction data.

Transceiver 360 includes a transmitter, such as a radio transmitter, to send environmental data to a remote facility, either directly or through one or more relay stations. In the illustrated embodiment, transceiver 360 includes a receiver, such as a radio receiver, to receive instructions from the remote facility, either directly or through one or more relay stations. Received instructions include direction data to change the attack angle or other instructions, such as to preserve power or begin transmitting environmental data, or some combination. In some embodiments either a receiver or transmitter are omitted and the transceiver 360 is replaced by a transmitter or receiver, respectively. In some embodiments, neither is included and transceiver 360 is omitted altogether.

The concepts of sailing at angles relative to the wind direction are well-established based on physics and implemented in numerous types of sailing vessels and sailing methods. A floating sea animal, *Velella velella* (By-the-Wind Sailor), illustrates these concepts in nature. It has an aerofoil-shaped float with part above the water so that its crest acts as a sail. Due to the configuration of their floats, variants of *Velella velella* sail either to the left or right of the wind direction.

One example embodiment of a suitable sailing buoy 301 is a boat-shaped hull with a keel and an aerofoil-shaped sail. Rigid aerofoil-shaped sails have been used on actual and model sailboats. As a common example, the sails used by most wind surfers are rigid aerofoil-shaped sails constructed from a thin strong material attached to a frame. Thus in some embodiments, a rigid and relatively short aerofoil-shaped sail is made rugged to withstand severe storm conditions. During high sea-states, boat-shaped hulls are likely to capsize. Thus, the hull in this embodiment is self-righting to overcome capsizing. How to design self-righting vessels is well-established in naval architecture. Well-known larger examples are Motor Lifeboats (MLB's) operated by the United States Coast Guard (USCG). In some of these embodiments, the hull is totally sealed from water intrusion and any deck surfaces are self-draining or self-bailing. Such embodiments are feasible based on known concepts, engineering, physics, and technologies.

A second example embodiment of a suitable sailing buoy is one that rests on the water surface; thereby being propelled over the water surface by the wind. An example is a sphere constructed of a strong material such as Polycarbonate and with a weight such that a large surface area is above water exposed to the wind. In this embodiment, the hull 308, float 311 and airfoil 322 are provided by the same structure. Such a sphere would be moved across the sea surface somewhat analogous to a beach ball being blown by the wind. Some of these embodiments include components for measuring the orientation of the device so that appropriate above water and below water sensors are activated for data collection at appropriate times. In some embodiments, means are included for allowing water into part of the sphere so that it settles down into the water for data collection and for removing water from part of the sphere so that it moves more readily with the wind. In various embodiments, such means are provided using valves or small pumps. For example, the widely used Givens life raft uses valves to admit water into a ballast chamber that maintains the life raft in an upright position. These life rafts have survived hurricane conditions.

A third example embodiment of a suitable floating device is a man-made variant based on *Velella velella*. This example is a variant of a boat-shaped hull with a keel and a short relatively rigid aerofoil-shaped sail. The fact that such a sailing device occurs in nature shows that a man-made version of it with modifications could be suitable for some embodiments.

Buoys, life rafts, and vessels have survived tropical storm, and hurricane, conditions. Based on known and established concepts, design of components for a suitable sailing buoy is within the present state-of-the art.

3. Method for Monitoring Tropical Storm

Figure 4:
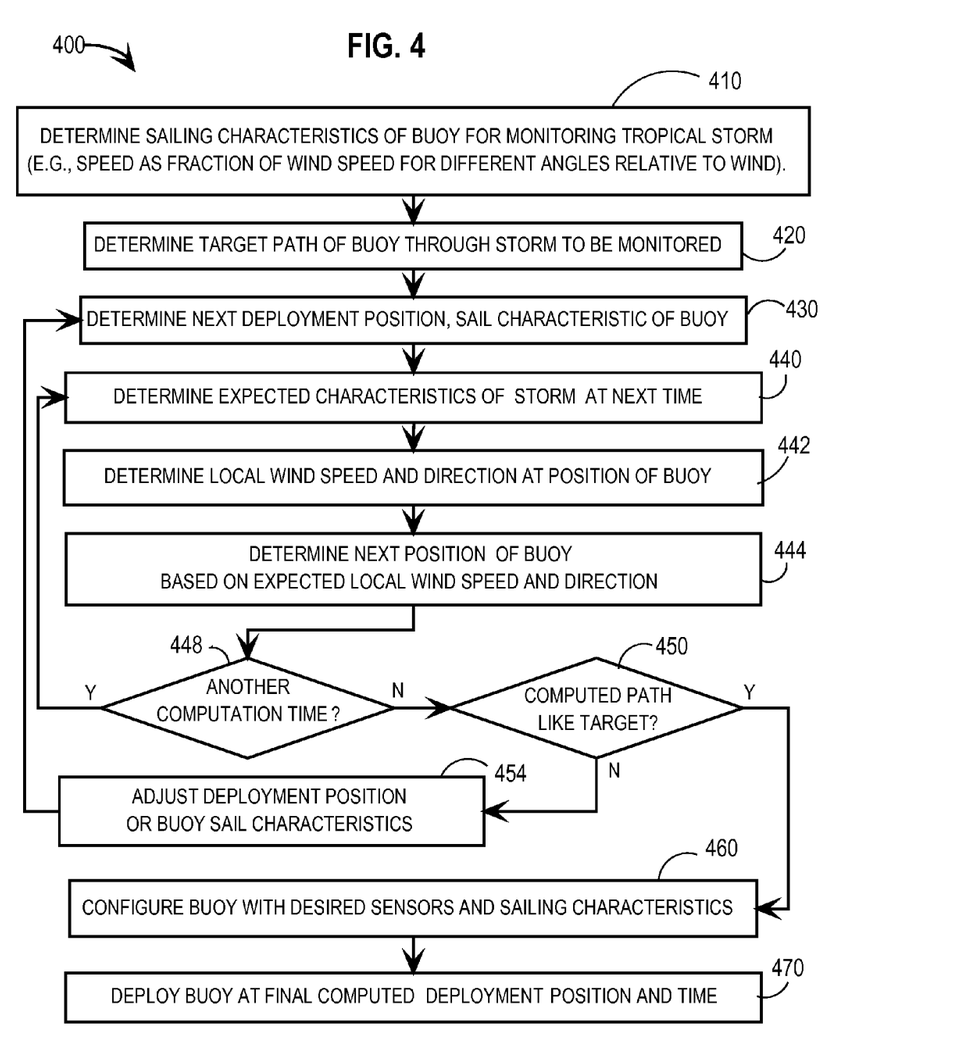
FIG. 4 is a flow chart that illustrates at a high level an example method for monitoring a tropical storm, according to an embodiment.

FIG. 4 is a flow chart that illustrates at a high level an example method 400 for monitoring a tropical storm, according to an embodiment. Although steps are shown in a particular order for purposes of illustration, in other embodiments one or more steps may be performed in a different order or overlapping in time, in series or in parallel, or one or more steps may be omitted or one or more steps may be added, or the method may be changed in some combination of ways.

In step 410, the sailing characteristics of the buoy in a tropical storm are determined. For example, the speed of the buoy relative to the local wind is determined for different attack angles and different wind speeds in the range of tropical storm wind speeds. Such characteristics may be determined in controlled conditions, such as a wind/wave tunnel, sea tests, or based on experience from previous deployments.

In step 420, a target measurement path through the tropical storm to be monitored is determined. Any method may be used to determine this path. For example, in some embodiments it is determined that a suitable target path is a trapped path in which the buoy circulates with the storm in the vicinity of the radius of maximum winds. In some embodiments, it is determined that a hover path is desired, in which the buoy stays in the side of the storm where the local wind direction is near parallel to the direction of storm progress, and the buoy moves in a direction approximately parallel to the direction of forward progress of the storm. In some embodiments, it is determined that a spiral path is desired, in which the buoy gradually transects the storm from the eye to its outer edges (or back). In some embodiments, the target path is an ideal path and not an actual path or an expected path.

In step 430 a trial deployment position of the buoy is determined. For example, a deployment position somewhere on the target path is selected as the trial deployment position. In some embodiments, the buoy has constant sail characteristics that cannot be changed and the trial deployment position is the only variable. In some embodiments, the buoy can be configured with any of several constant or time-variable sailing characteristics, e.g., different attack angles, different float and righting weight options etc. In such embodiments, step 430 includes determining initial buoy configuration with constant or time varying sailing characteristics. Note that the sailing characteristics, as used here, include motorized propulsion of the buoy with speed and direction determined based on and relative to a local measured wind.

In step 440, the expected characteristics of the storm at the current buoy position at the next time is determined. In some embodiments a numerical model is used to predict storm characteristics at the position of the buoy, the evolution of time, and the projected movement of the storm. In some embodiments the tropical storm is modeled with a simple circular storm, as depicted in FIG. 1, and a simple linear progression. In some embodiments average winds are used for the storm. In some embodiments, a sophisticated model of an actual storm is used.

Due to the complicated interplay of storm characteristics including maximum winds, radii of maximum winds, inflow angles, forward speeds, forward directions, and asymmetries and changes with time of these characteristics, combined with a floating device's sailing characteristics, computer simulations are useful in some embodiments. There are a number of mathematical models to calculate tropical storm, or hurricane, winds. For example, equations developed by Holland (Holland, G. J., An Analytic Model of the Wind and Pressure Profiles in Hurricanes, Monthly Weather Review, volume 108, pages 1212-1218, 1980) have been used often. As a second example, hurricane wind equations (e.g., Houston, S. H. and Powell, M. D., Observed and Modeled Wind and Water-Level Response from Tropical Storm Marco (1990), Weather and Forecasting, volume 9, pages 427-439, 1994) in NOAA's Sea, Lake, and Overland Surge from Hurricanes (SLOSH) storm surge model also have been used often.

In illustrated embodiment, described in a later section, these mathematical models for winds were employed to simulate local wind and predict buoy movement and paths. Numerous storms were simulated with various maximum winds, radii of maximum winds, inflow angles, forward speeds, forward directions, and changes of these characteristics with time. Floating devices with various capabilities to sail downwind and at different angles to the wind direction were placed at various positions within and around the simulated storms.

In step 442, the expected characteristics of the storm at the next time are used to determine the local wind speed and direction at the current position of the buoy at this time. For example, a computer model of the storm is used to compute a simulated local wind at the position of the buoy.

In step 444, the expected local wind at the current expected position of the buoy and the current sailing characteristics of the buoy are used to predict the next position of the buoy at the next time. The next position f the buoy is added to the previous position of the buoy relative to the storm center to construct the next segment of the buoy's path through the storm.

In step 448, it is determined if there is another time in the computed simulation of expected storm characteristics and buoy position. If so, control passes back to step 440 to determine the expected characteristics of the storm at the next time, described above.

If it is determined, in step 448, that the simulation is complete and no computation is needed for another time, control passes to step 450. Any method may be used to determine that the simulation is complete. For example, in various embodiments the simulation can proceed for a specified amount of time (e.g., five days), or until the buoy's path takes it outside the storm.

In step 450, it is determined whether the computed, expected path for the buoy is similar enough to the target measurement path as to be useful for collecting in situ measurements. If not, control passes to step 454. In step 454, the deployment position and or buoy sail characteristics are adjusted for a subsequent simulation computation. Any method may be used to determine the adjustment. In some embodiments, the adjustment is a random change in start position or sail characteristics. In some embodiments, the adjustment is based on (e.g., proportional to) the deviation of the computed simulated path from the target measurement path. Control then passes back to step 430 to set the next deployment position and initial sail characteristics based on the adjustment in step 454. As indicated above, in some embodiments, the buoy sail characteristics are fixed and cannot be adjusted. In such embodiments, step 454 involves only the adjustment of the deployment position for the buoy.

For example, if the target measurement path is a trapped path, but the simulation indicates that the buoy as last deployed would spiral out of the storm, then the buoy deployment position is moved closer to the eye, or the sailing characteristics are set for a steeper attack angle toward the center of the storm (e.g., steeper angle left of the local wind in the Northern hemisphere), or some combination. Control then passes back to step 430 to start the simulation with the new deployment position or sailing characteristics or both.

If it is determined, in step 450, that the computed path of the buoy in the storm is sufficiently like the target measurement path, then control passes to step 460. Any method may be used to determine sufficient similarity between the computed path and the target path. Example measures of deviation are total distance between paths at end of simulation, mean difference between the paths, or mean square distance between the paths, among others.

In step 460, the buoy is configured with the desired sensors and with the sailing characteristics determined during the simulation to give the path most like the target measurement path. In some embodiments, this includes storing changes in sailing directions on a data storage device in the onboard electronics.

In step 470, the buoy is deployed at the deployment position and during the time of the storm's evolution that was computed to give the path most like the target measurement path. Any method may be used to deploy the buoy. Example deployment methods include placing the buoy in the path of the storm, dropping from an aircraft either with a parachute or without, or launching from a surface or subsurface vessel. In some embodiments, step 470 includes receiving buoy position data during the buoy's time in the storm, computing changes in sailing characteristics needed to bring the buoy more in line with the target path and sending direction data to the buoy to change the sailing characteristics as just computed. Such embodiments allow dynamic correction of buoy path based on real time measurements, for buoys with controllable sailing characteristics.

4. Example Embodiments

Many simulations were performed that included varying storm characteristics such as storm intensity and changing storm forward speeds and directions with time, changing deployment positions of floating devices, and changing sailing characteristics of floating devices. Simulations proving the described behaviors were made using both a fixed direction sailed relative to the wind direction and a changeable angle sailed relative to the wind direction. A fixed direction sailed relative to the wind direction would enable using an approximately fixed sail/airfoil obviating the need for a mechanism to move a sail/airfoil relative to the hull or keel. Thus, the floating device would be simpler. The mathematical wind models, as described above, were also changed in reasonable ways from their original formulations. Details of a floating device's movement path shown as its trajectory on a map of the sea surface, or relative to the storm center, change, but the device can be maintained in the vicinity of a moving storm. In addition, by changing the device's sailing characteristics and deployment locations, its paths can be made to form various patterns for collecting data within one or more regions of a storm.

4.1 Hover Path

Figure 5:
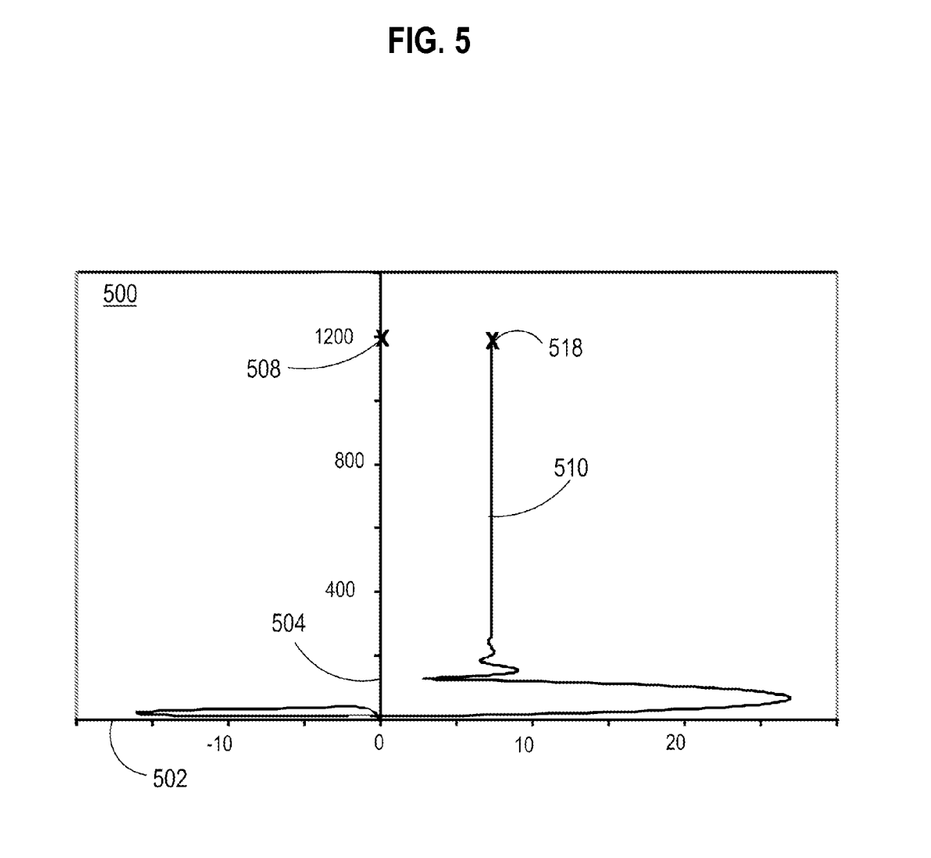
FIG. 5 is a graph that illustrates an example computed measurement path in a tropical storm, according to an embodiment.

FIG. 5 is a graph 500 that illustrates an example computed measurement path 510 in a tropical storm, according to an embodiment. The horizontal axis 502 is distance in nautical miles from the center of an initial location of a storm in a direction 90 degrees to the right of the direction of propagation of the storm. The vertical axis 504 is distance in nautical miles from the center of an initial location of a storm in the direction of propagation of the storm.

The expected position of a buoy is plotted over five days in which the storm moves from the origin with coordinate (0,0) where the horizontal axis 502 and vertical axis 504 intersect, to position 508 with coordinate (0,1200). Coordinates are given as horizontal distance followed by vertical distance.

Path 510 indicates the computed positions of the buoy during those five days ending at position 518 with coordinate (7, 1200).

These expected positions of storm and buoy result from modeling storm and buoy characteristics as follows. In the following, the sailing direction given includes the wind inflow angle. That is, if the inflow angle is 15 degrees centerward from a circular wind direction and the sailing direction is 20 degrees, sailing is actually 5 degrees relative to the local wind. The deployment location is 40 nautical miles ahead of the storm. The path is computed using a computer software program based on step 440 to step 448 of method 400. The following inputs were used: radius to maximum winds=20 nautical miles, maximum wind speed=100 knots (nautical miles per hour), forward speed=10 knots, fraction of hurricane wind speed that the floating device sails=0.15, direction of floating device movement relative to storm circular wind direction=20 degrees (including inflow angle and sailing to left of wind).

In this example embodiment, depicted in FIG. 5, the floating device has reached a position on the right side the storm center where it is sailing approximately in the direction of storm movement at a speed that approximately matches the storm forward speed. The expected path is shown for a time period of five days. The floating device continues to track the storm indefinitely as long as the storm is over water.

The simulation depicted in FIG. 5 and other simulation outputs demonstrate that a floating device can maintain itself, by sailing, in the vicinity of a storm as the storm moves. Important aspects are the fraction of the wind speed that the floating device can maintain relative to the storm forward speed and the capability of the device to sail at angles toward the storm center. For example, as the inflow angle and/or the capability of the device to sail at angles toward the storm center increases, the needed fraction of the wind speed at which the device needs to sail decreases. Typical minimum sailing speeds in a hurricane are approximately 15% to 20% of the wind speeds, but these are not precise numbers due to the number of variables involved and the degree to which the floating device is maintained near the center. Desired sailing speeds are attainable based on sailing considerations.

4.2 Outward Spiral Path

Figure 6:
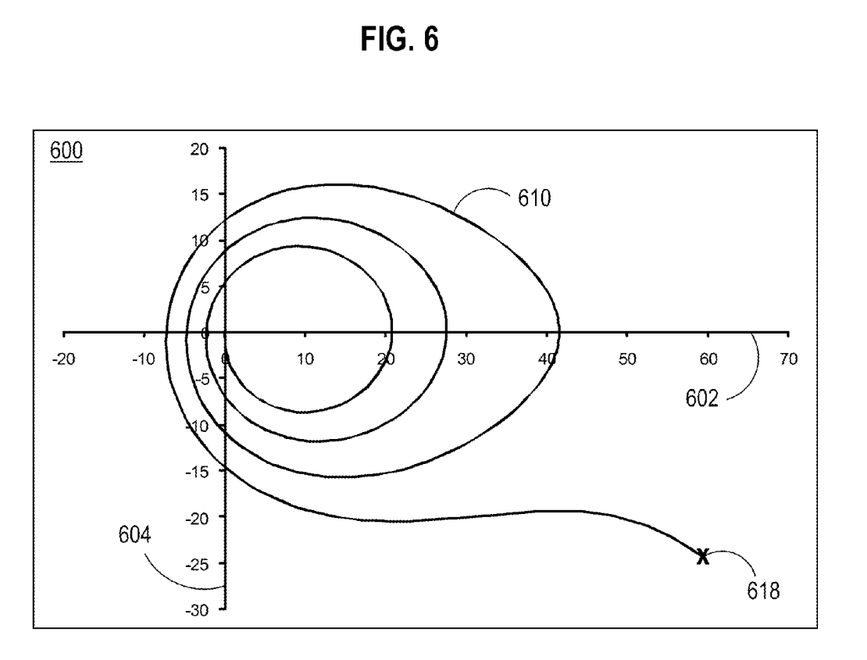
FIG. 6 is a graph that illustrates another example computed measurement path in a tropical storm, according to an embodiment.

FIG. 6 is a graph 600 that illustrates another example computed measurement path 610 in a tropical storm, according to an embodiment.

The vertical axis 604 is distance in nautical miles from the center of a storm in the direction of propagation of the storm. The horizontal axis 602 is distance in nautical miles from the center of the storm in a direction 90 degrees to the right of the direction of propagation of the storm. Thus, relative to the Earth, the axes of plot 600 are moving upward with the storm center.

The expected position of a buoy is plotted over two days relative to the storm center (unlike FIG. 5, which depicts the path relative to the Earth). Coordinates are given as horizontal distance followed by vertical distance. Path 610 indicates the computed positions of the buoy during those two days relative to the center of the storm (which remains at coordinate (0,0); and the buoy's path ends at position 618 with coordinate (59, −24).

In this embodiment, the device is deployed at the storm center which has coordinates (0,0). The high winds catch up with the buoy and accelerate it. The simulated path "spirals out" relative to the storm center thus moving through different storm regions. The following inputs were used: radius to maximum winds=20 nautical miles, maximum wind speed=100 knots, forward speed=10 knots, fraction of hurricane wind speed that the floating device sails=0.15, direction of floating device movement relative to circular wind direction=0 degrees. The simulated path is shown for a time period of two days. By changing the floating device's sailing characteristics, the device can execute different patterns and remain near the storm for shorter or longer time periods.

FIG. 6 and other simulation outputs demonstrate that by changing the floating device's sailing speed and/or by changing its sailing toward the storm center, that the device can "spiral out" of a storm at a pre-planned rate. Other changes in the floating device's sailing speed, angle sailed relative to the wind direction, or deployment location enable it to execute other patterns within one or more regions of a storm. This mode of operation would be of high interest for collecting data within different regions of a storm.

4.3 Example Buoy Deployments

A tropical storm, hurricane, or similar storm is identified typically using satellite remote sensing. It is assumed for purposes of illustration that the storm is of special interest for scientific research or because of its threat for damage both over water and, more importantly, as it makes landfall. Using the storm's geographical position and direction of movement, locations to deploy one or more floating devices are determined These locations may be selected more optimally using a computer software program with the logic for performing step 440 to step 448 of method 400 to determine a floating device's projected path based on present and forecast storm characteristics.

A buoy is configured to be pre-equipped with sensors for collecting data such as position, air temperature, water temperature, atmospheric pressure, wind speed, or wind direction, as described above.

One or more floating devices are deployed at desired locations by ship or aircraft. Deployment of other types of buoys have been accomplished by both ship and aircraft. Deployments of floating devices by ship would typically be ahead of the storm to decrease dangers to the ship and its crew due to high sea states.

As one or more buoys move approximately with the storm, or in paths that approximate target measurement paths through the storm, oceanographic and meteorological measurement data are collected. The collected measurement data are stored or relayed to a remote facility using any known method.

5. Hardware Overview

Figure 7:
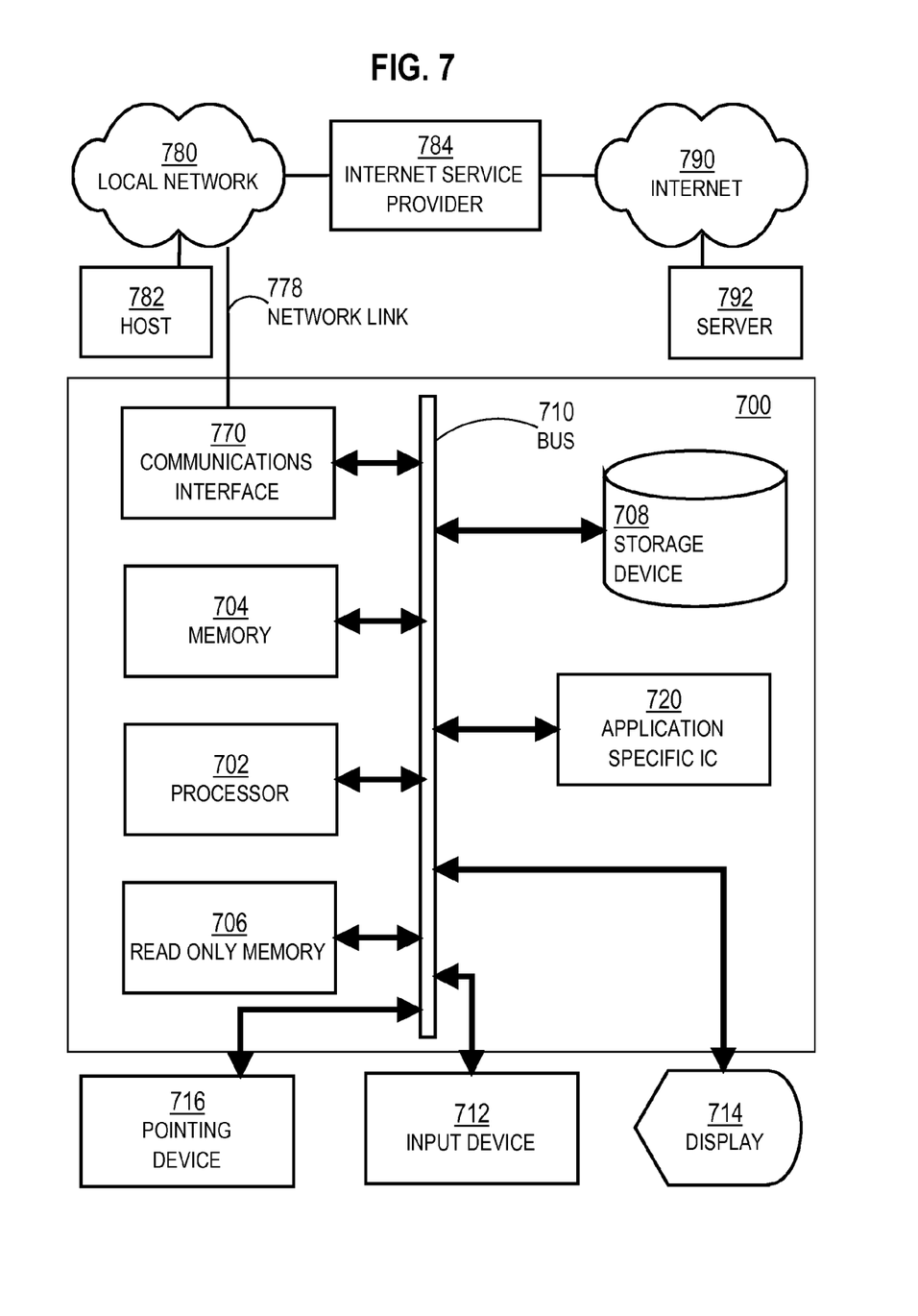
FIG. 7 is a block diagram that illustrates a computer system upon which an embodiment of the invention may be implemented.

FIG. 7 is a block diagram that illustrates a computer system 700 upon which an embodiment of the invention may be implemented. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitute computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 770 sends and receives electrical, acoustic or electromagnetic signals, including infrared and optical signals, that carry information streams, such as digital data.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720, may be used in place of or in combination with software to implement the invention. Thus, embodiments of the invention are not limited to any specific combination of hardware and software.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received, or may be stored in storage device 708 or other non-volatile storage for later execution, or both. In this manner, computer system 700 may obtain application program code in the form of a signal on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red a carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

6. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for monitoring tropical storm conditions, comprising:
   determining a target sea-surface path relative to a tropical storm center where in situ measurements are desired;
   configuring a buoy to include one or more sensors for one or more in situ measurements and to move relative to a local wind in the tropical storm so as to approximately follow the target sea surface path; and
   deploying the buoy in the tropical storm at a location substantively on the target sea surface path.

2. The method as recited in claim 1, wherein configuring the buoy further comprises configuring the buoy to maintain a substantively constant angle relative to the local wind, wherein the substantively constant angle is toward the center of the tropical storm.

3. The method as recited in claim 2, wherein the substantively constant angle is selected from a range from about five (5) degrees to about twenty five (25) degrees.

4. The method as recited in claim 2, wherein the substantively constant angle is about twenty (20) degrees.

5. The method as recited in claim 1, wherein configuring the buoy further comprises configuring the buoy to move at a speed that is above a particular fraction of a wind speed of the local wind.

6. The method as recited in claim 2, wherein the particular fraction is selected in a range from about fifteen percent (0.15) to about twenty percent (0.20).

7. The method as recited in claim 1, wherein configuring the buoy further comprises configuring the buoy with a transmitter to transmit observation data based on output from the one or more sensors.

8. The method as recited in claim 1, wherein configuring the buoy further comprises configuring the buoy with a receiver to receive direction data that indicates a speed and direction relative to the local wind and configuring the buoy to move relative to the local wind based on the direction data.

9. The method as recited in claim 1, wherein configuring the buoy to move relative to the local wind further comprises configuring the buoy to move based on sail power derived from the local wind.

10. The method as recited in claim 1, wherein the target sea surface path is a spiral centered on the tropical storm center.

11. The method as recited in claim 1, wherein the target sea surface path is substantively a circle centered on the tropical storm center at a distance near a radius of maximum wind speed in the tropical storm.

12. The method as recited in claim 1, wherein the target sea surface path is a point displaced from the tropical storm center where the local wind is sufficient to propel the buoy in a direction parallel to a direction of translation of the center of the tropical storm.

13. A buoy for monitoring tropical storm conditions comprising:
   means for automatically maintaining position near a sea surface;
   means for automatically moving at a particular direction and a particular speed relative to a local wind to approximately follow a predetermined sea surface path;
   means for automatically measuring one or more environmental conditions in a vicinity of the apparatus; and
   means for automatically sending, to a remote facility, observation data based on output from the means for measuring one or more conditions.

14. A buoy as recited in claim 13, wherein the means for moving at the particular direction and the particular speed relative to the local wind comprises: a sail that causes a first force from the local wind to be transferred to the apparatus; and, a keel that causes a second force from the water at an angle from the local wind.

15. A buoy as recited in claim 14, wherein the means for moving at the particular direction and the particular speed relative to the local wind further comprises a means to keep the sail above the sea surface.

16. A buoy as recited in claim 13, wherein:
   the apparatus further comprises means for receiving direction data that indicates a change in the particular direction; and
   the means for moving at the particular direction and the particular speed relative to the local wind further comprises means for changing the particular direction in response to receiving the direction data.

17. A buoy as recited in claim 13, wherein the environmental conditions are relevant to forecasting one or more of a strength or a geographic progress of a tropical storm.

18. A buoy as recited in claim 13, wherein the particular speed is about fifteen percent (0.15) to about twenty percent (0.20) of the local wind speed.

19. A buoy as recited in claim 13, wherein the particular direction is about twenty degrees leftward of the local wind when the apparatus is deployed in a northern hemisphere of Earth, or about twenty degrees rightward of the local wind when the apparatus is deployed in a southern hemisphere of Earth.

20. A computer-readable medium carrying one or more sequences of instructions for monitoring a tropical storm, wherein execution of the one or more sequences of instructions by one or more processors causes the one or more processors to perform the steps of:
   determining a target sea-surface path relative to a tropical storm center where in situ measurements are desired; and
   determining a particular speed and a particular direction relative to a local wind for a buoy such that the buoy is predicted to approximately follow the target sea surface path.

* * * * *